US007007245B2

(12) United States Patent
D'Souza et al.

(10) Patent No.: US 7,007,245 B2
(45) Date of Patent: Feb. 28, 2006

(54) PRODUCT SELECTION EXPERT SYSTEM

(75) Inventors: Adrian D'Souza, Walnut Creek, CA (US); David Anderson, Walnut Creek, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 111 days.

(21) Appl. No.: 10/800,046

(22) Filed: Mar. 12, 2004

(65) Prior Publication Data

US 2005/0203860 A1 Sep. 15, 2005

(51) Int. Cl.
*G06F 3/00* (2006.01)

(52) U.S. Cl. ...................... 715/853; 715/854; 715/780; 715/962; 715/751; 715/971; 705/14; 705/26; 705/27

(58) Field of Classification Search ................ 715/780, 715/853, 854, 962, 751, 971; 705/14, 26, 705/27
See application file for complete search history.

(56) References Cited

U.S. PATENT DOCUMENTS

2002/0049642 A1 4/2002 Moderagger et al.

(Continued)

*Primary Examiner*—Ba Huynh
*Assistant Examiner*—Mylinh Tran
(74) *Attorney, Agent, or Firm*—Timothy J. Hadlock

(57) ABSTRACT

The invention includes a system for product selection, the system including: a CPU; a memory operatively connected to the CPU, the memory containing a program adapted to be executed by the CPU and the CPU and memory cooperatively adapted for presenting a user interface and expert interface to an expert system for product selection; a expert-interface code segment embodied on a computer-readable medium configured and adapted for: creating and modifying via a graphical user interface a graphically-displayed tree structure representing a plurality of product applications; associating and modifying via a graphical user interface one or more use condition with each node of the tree structure; and associating and modifying via a graphical user interface one or more suitability ratings for a plurality of applications; creating and modifying via a graphical user interface a list of products associating and modifying via a graphical user interface one or more product with each leaf node of the tree structure; associating via a graphical user interface use condition choices with each product associating via a graphical user interface suitability ratings for each product a user-interface code segment embodied on a computer-readable medium configured and adapted for selecting via a graphical-use interface a path in the tree structure, and for displaying on the same window of the graphical-use interface: the products associated with the leaf node of the selected path; the use conditions associated with each node of the selected path; and the product usability suitability indicators associated with each node of the selected path; selecting via the same window of the graphical-use interface one or more of the use conditions associated with the nodes of the selected path and for entering the user-defined relative importance of the product usability suitability indicators for the intended application of the products associated with the leaf nodes of the selected path; comparing the selected use conditions with the displayed products, where products not having such selected use conditions as attributes are filtered out of the displayed list of products; comparing the entered relative importance of the product usability suitability indicators with the product usability suitability indicators associated with the displayed products, associating a score with each displayed product indicating the correlation of the comparison, and displaying the score with the product; and printing the resulting product list, corresponding suitability scores, selected tree path, selected use conditions, and entered relative importance of product usability suitability indicators.

22 Claims, 21 Drawing Sheets

U.S. PATENT DOCUMENTS

2002/0118225 A1 8/2002 Miksovsky
2002/0122078 A1 * 9/2002 Markowski ................. 345/853
2002/0169487 A1 11/2002 Graindorge
2003/0018448 A1 1/2003 Makowski et al.
2003/0033519 A1 2/2003 Buckman et al.
2003/0055742 A1 3/2003 Hodl
2003/0105753 A1 6/2003 Lee et al.
2003/0146942 A1 8/2003 Helgason et al.
2003/0229581 A1 12/2003 Green et al.
2004/0019404 A1 1/2004 Cheng et al.
2005/0080669 A1 4/2005 Zhang

* cited by examiner

400

```
 <?xml version="1.0" encoding="utf-8" ?>
- <applications>
 - <application id="0">
     <answer />
     <question>Select an Application</question>
     <parent />
   - <condition cid="1">
       <prompt>Application Method<,/prompt>
       <choice>Spray</choice>
       <choice>Brush</choice>
       <choice>Gun</choice>
     </condition>
   - <preference pid="3">
       <prompt>Water washout resistance</prompt>
     </preference>
   - <preference pid="4">
       <prompt>Continuous heavy loads</prompt>
     </preference>
  </application>
- <application id= "1">
     <answer>Industrial</answer>
     <question>Which type of industrial?/question
     <parent>0</parent>
 </application>
 - <application id="2">
     <answer>Automotive</answer>
     <question>What type of automotive?</question>
     <parent>0</parent>
 </application>
+ <application id="4">
- <application id="5">
  <answer>Wheel bearings</answer>
  <question/>
  <parent>2</parent
- <condition cid="11">
     <prompt>Operating Conditions</prompt>
     <choice>High temperature</choice>
     <choice>High water exposure</choice>
     <choice>Normal Duty</choice>
  </condition>
  </application>
- <application id ="3">
   <answer>Farm Machinery</answer>
   <question>What type of farm machinery?/question>
   <parent>0<parent>
 </application>
</applications>
```

```
<?xml version="1.0" encoding="utf-8" ?>
- <greases>
  - <grease>
     <name>Grease Product A</name>
   - <applications>
      <application>4</application>
      <application>5<application>
     </applications>
   - <preferences>
       <preference pid="0">4</preference>
       <preference pid="1">9</preference
     </preference
 - <conditions>
   - <condition cid+"0">
     - <Choices>
         <choices>Brush</choice>
         <choice>Gun</choice>
       </Choices>
     </condition>
   - <condition cid="1">
     - <Choices>
         <choice>High Temperature<choice>
        </Choices>
     </condition>
   </conditions>
 </grease>
- <grease>
   <name>Grease Product B</name>
 - <applications>
     <application>5</application>
   </applications>
 - <preferences>
     <preference pid="0">2</preference>
     <preference pid="1">7</preference>
   </preference>
 - <conditions>
   - <condition cid="0">
     - <Choices>
         <choice>Spray</choice>
       </Choices>
   </condition>
 - <condition cid="1">
   - <Choices>
      <choice>Normal Duty</choice>
     </Choices>
    </condition>
   </conditions>
 </grease>
</greases>
```

FIG. 5

Step 2- User definable conditions which is acceptable for this product or service is defined by highlighting appropriate single conditions or combinations of conditions.

Step 3- Expert assessments of ratings for each of the products or service in terms of importance to the end user are assigned by experts

PRODUCT SELECTION EXPERT SYSTEM

COPYRIGHT NOTICE AND AUTHORIZATION

This patent document contains material which is subject to copyright protection.

©Copyright 2004. Chevron U.S.A. Inc. All rights reserved.

With respect to this material which is subject to copyright protection. The owner, Chevron U.S.A. Inc., has no objection to the facsimile reproduction by any one of the patent disclosure, as it appears in the Patent and Trademark Office patent files or records of any country, but otherwise reserves all rights whatsoever.

I. FIELD OF THE INVENTION

The invention relates to computer-implemented process and system for a expert system for product selection.

II. BACKGROUND OF THE INVENTION

In the past, customer selection among commercial products with an expert system has been a very difficult procedure requiring a lot of time and user expertise. For example, most product manufactures simply provide many tables of different products. The customer must hunt among these tables to find a product(s) that will suit his needs. Detailed information about the product to allow the customer to make his choice is not readily available. Also, the many factors that go into such a selection make the decision so complex that expert help is often required.

Similarly, inputting of expert knowledge into the knowledge database of an expert system has required assistance and interviewing by the computer engineer building the expert system and the expert.

It would be desirable to have an expert system which is user friendly both for the expert and the customer. The instant invention provides such a solution.

IV. SUMMARY OF THE INVENTION

The proposed invention in one embodiment is a web-based expert system for product selection and method of using the system that allows the experts to quickly input expert knowledge and for a customer to make correct product choices quickly and efficiently. Key aspects of the invention, in one preferred embodiment, include: (1) a graphical user interface that guides the customer through a choice of applications, specifications, and product ratings, and interactively displays a scored list of available products; (2) the entire selection process in shown in segments of just one screen so the user can go back and change his request interactively; (3) a user interface that provides direct links to Web-based product data such as product data sheets and Material Safety Data Sheets, or alternatively provides links to generic web search engines such as Yahoo® or Google®; and (4) has program instructions separate from product information, so that product data can be easily kept up-to-date and distributed through the web. Program instructions are made so easily that it does not require expert computer knowledge. The expert program section can make data changes. The user program can run without the expert program to assure product integrity and avoid tampering with the data by the user More particularly, the invention includes a system for product selection, the system including: a CPU; a memory operatively connected to the CPU, the memory containing a program adapted to be executed by the CPU and the CPU and memory cooperatively adapted for presenting a user interface and expert interface to an expert system for product selection; a expert-interface code segment embodied on a computer-readable medium configured and adapted for: creating and modifying via a graphical user interface a graphically-displayed tree structure representing a plurality of product applications; associating and modifying via a graphical user interface one or more use condition with each node of the tree structure; and associating and modifying via a graphical user interface one or more suitability ratings for a plurality of applications; creating and modifying via a graphical user interface a list of products associating and modifying via a graphical user interface one or more product with each leaf node of the tree structure; associating via a graphical user interface use condition choices with each product associating via a graphical user interface suitability ratings for each product a user-interface code segment embodied on a computer-readable medium configured and adapted for selecting via a graphical-use interface a path in the tree structure, and for displaying on the same window of the graphical-use interface: the products associated with the leaf node of the selected path; the use conditions associated with each node of the selected path; and the product usability suitability indicators associated with each node of the selected path; selecting via the same window of the graphical-use interface one or more of the use conditions associated with the nodes of the selected path and for entering the user-defined relative importance of the product usability suitability indicators for the intended application of the products associated with the leaf nodes of the selected path; comparing the selected use conditions with the displayed products, where products not having such selected use conditions as attributes are filtered out of the displayed list of products; comparing the entered relative importance of the product usability suitability indicators with the product usability suitability indicators associated with the displayed products, associating a score with each displayed product indicating the correlation of the comparison, and displaying the score with the product; and printing the resulting product list, corresponding suitability scores, selected tree path, selected use conditions, and entered relative importance of product usability suitability indicators.

Another embodiment of the invention includes a method for product selection comprising: selecting via a graphical-use interface a path in a tree structure, and for displaying on the same window of the graphical-use interface: the products associated with the leaf node of the selected path; the use conditions associated with each node of the selected path; and the product usability suitability indicators associated with each node of the selected path; selecting via the same window of the graphical-use interface one or more of the use conditions associated with the nodes of the selected path and for entering the user-defined relative importance of the product usability suitability indicators for the intended application of the products associated with the leaf nodes of the selected path; comparing the selected use conditions with the displayed products, wherein products not having such selected use conditions as attributes are filtered out of the displayed list of products; comparing the entered relative importance of the product usability suitability indicators with the product usability suitability indicators associated with the displayed products, associating a score with each displayed product indicating the correlation of the comparison, and displaying the score with the product; and printing the resulting product list, corresponding suitability scores, selected tree path, selected use conditions, and entered relative importance of product usability suitability indicators.

Another embodiment of the invention includes a machine-readable program storage medium tangibly embodying sequences of instructions, the sequences of instructions for execution by at least one processing system, the sequences of instructions to perform steps for: selecting via a graphical-use interface a path in a tree structure, and for displaying on the same window of the graphical-use interface: the products associated with the leaf node of the selected path; the use conditions associated with each node of the selected path; and the product usability suitability indicators associated with each node of the selected path; selecting via the same window of the graphical-use interface one or more of the use conditions associated with the nodes of the selected path and for entering the user-defined relative importance of the product usability suitability indicators for the intended application of the products associated with the leaf nodes of the selected path; comparing the selected use conditions with the displayed products, wherein products not having such selected use conditions as attributes are filtered out of the displayed list of products; comparing the entered relative importance of the product usability suitability indicators with the product usability suitability indicators associated with the displayed products, associating a score with each displayed product indicating the correlation of the comparison, and displaying the score with the product; and printing the resulting product list, corresponding suitability scores, selected tree path, selected use conditions, and entered relative importance of product usability suitability indicators. These and other features and advantages of the present invention will be made more apparent through a consideration of the following detailed description of a preferred embodiment of the invention. In the course of this description, frequent reference will be made to the attached drawings.

V. BRIEF DESCRIPTION OF THE DRAWINGS

Figure 6:
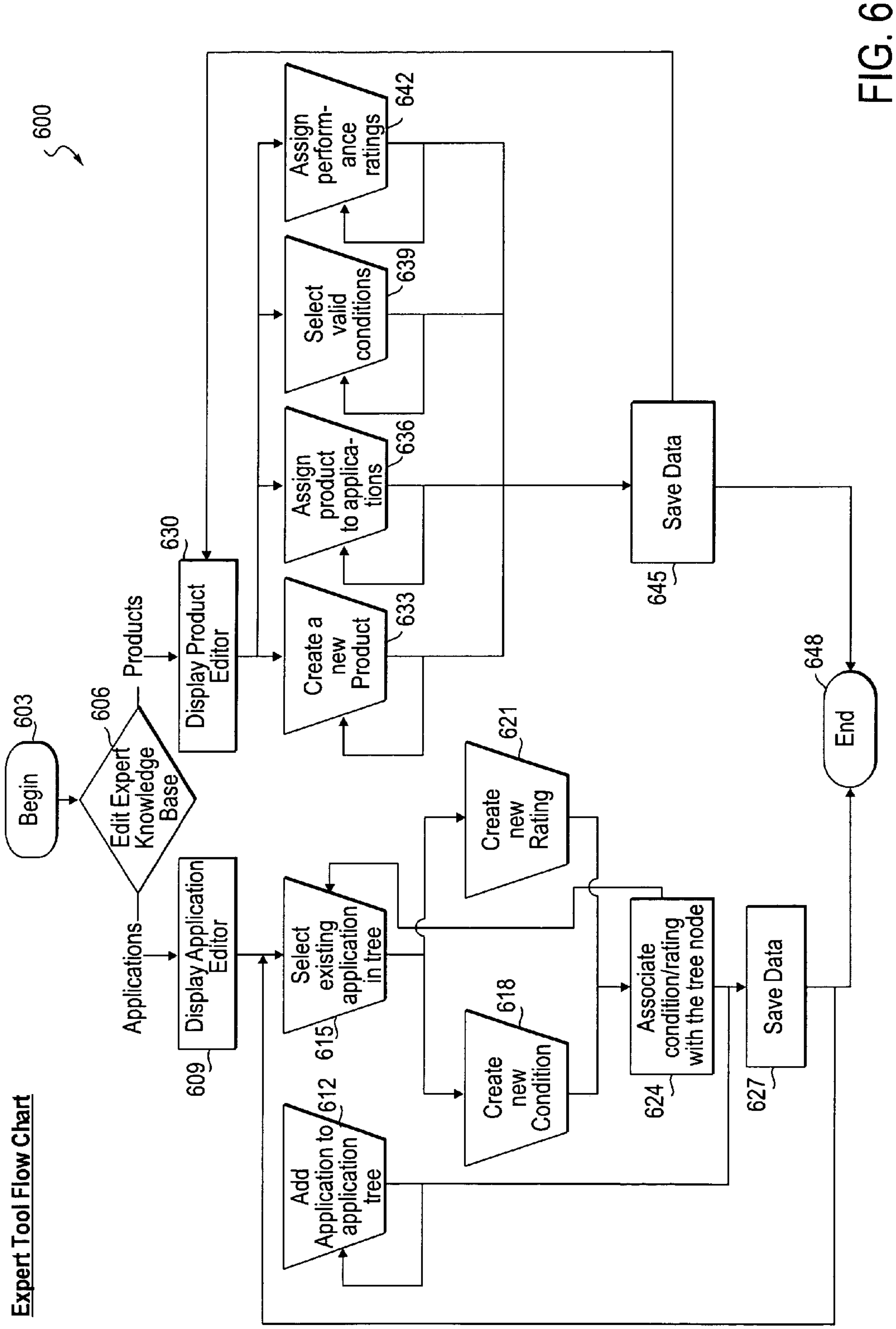

FIG. 4 depicts in one embodiment an exemplary XML file implementation of the tree, i.e., the application tree structure, aspect of the invention, FIG. 5 depicts in one embodiment an exemplary XML file implementation of the product data and its association with the application tree data FIG. 6 depicts in one embodiment depicts in one embodiment a schematic process flow diagram for the expert-interface aspect of the invention.

Figure 7:
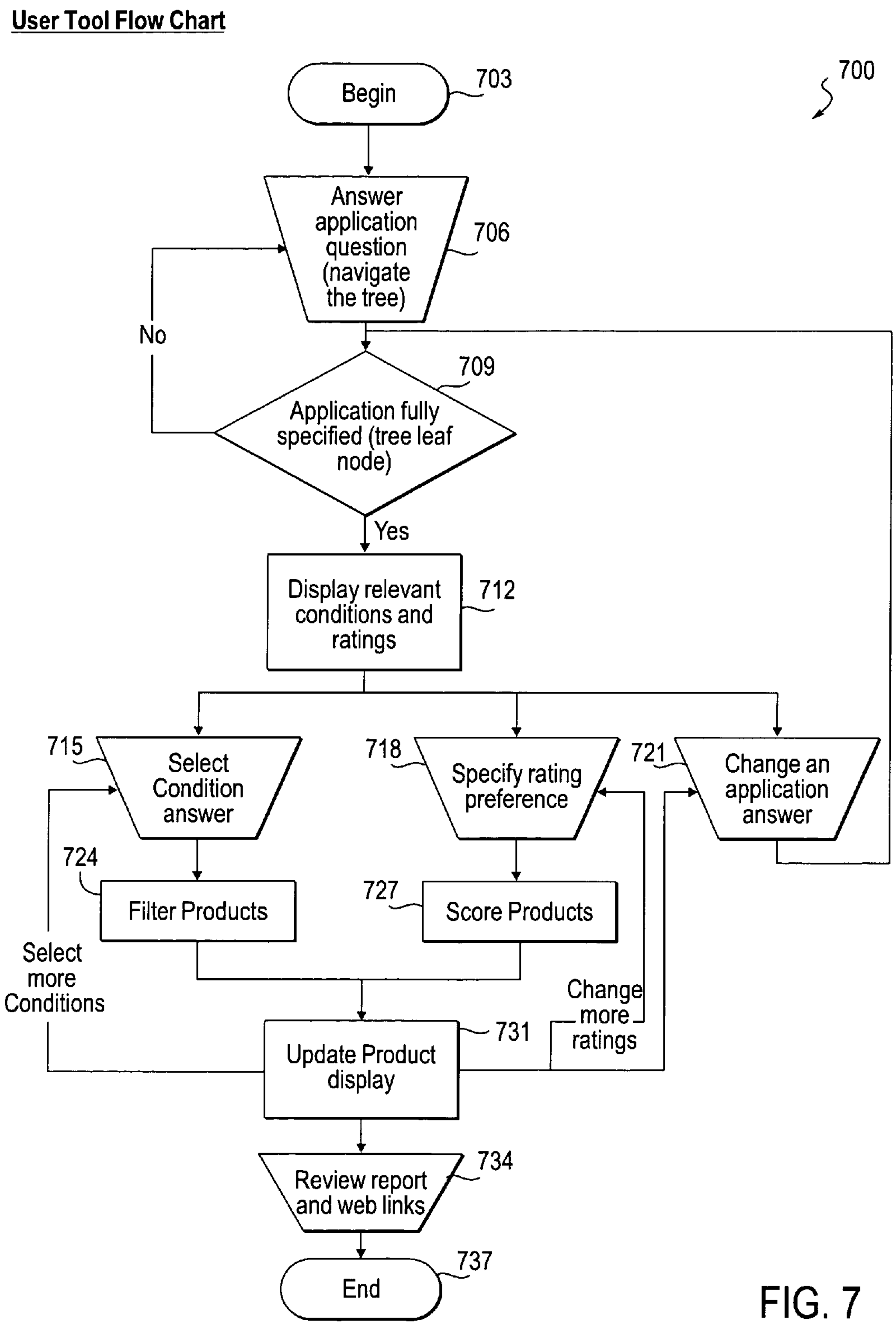
Figure 8:
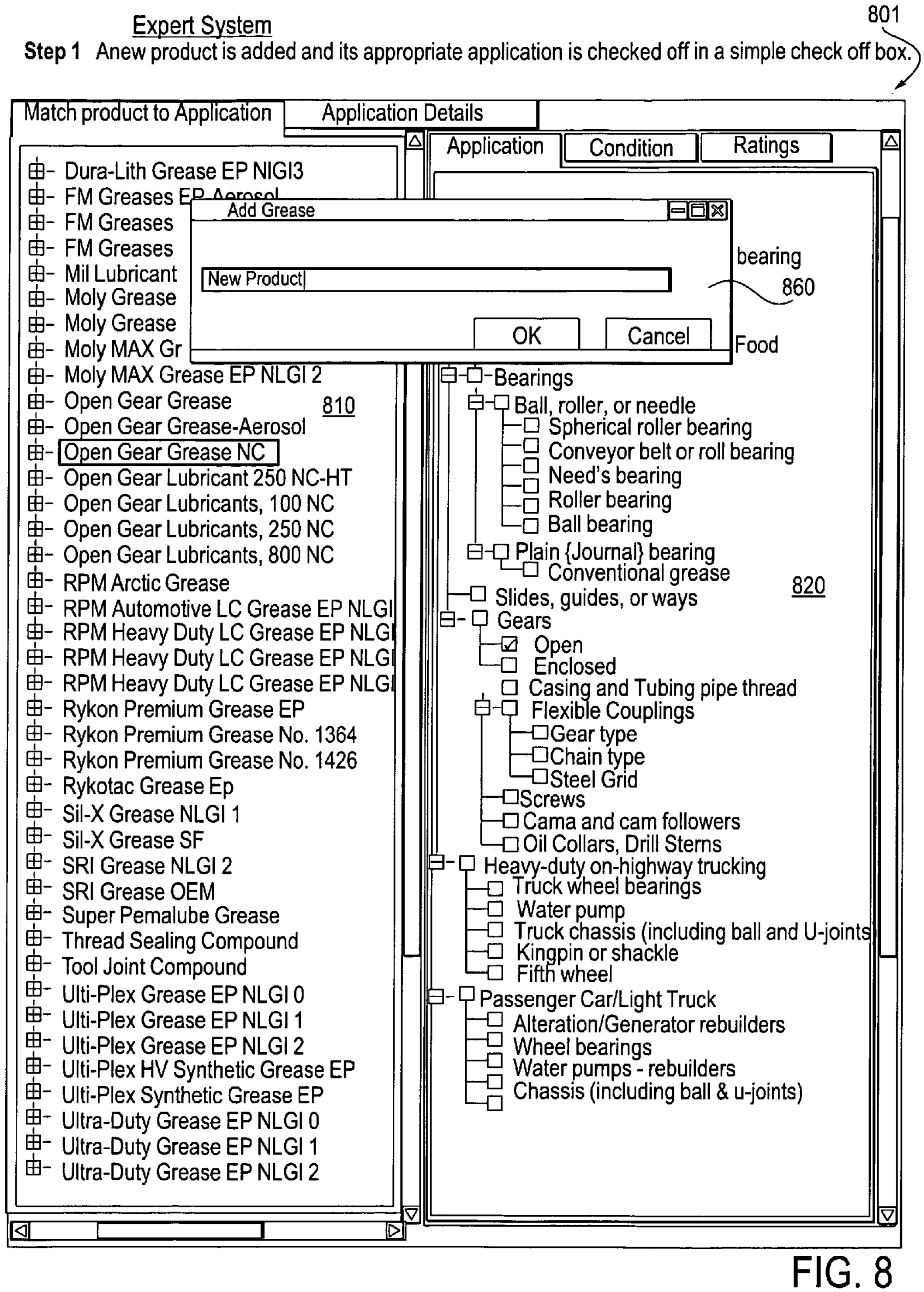

FIG. 7 depicts in one embodiment depicts in one embodiment a schematic process flow diagram for the user-interface aspect of the invention.

FIG. 8–11 depict in one embodiment exemplary screen shots of the expert-interface aspect of the invention.

FIG. 12–21 depict in one embodiment exemplary screen shots of the user-interface aspect of the invention.

VI. DETAILED DESCRIPTION OF THE DRAWINGS AND PREFERRED EMBODIMENTS

A. Introduction

The following discussion and figures include a general description of a suitable computing environment in which the invention may be implemented. While the invention will be described in the general context of a system and an application program that runs on an operating system in conjunction with general purpose computers, an internet, and web, application, and email servers and clients, those skilled in the art will recognize that the invention also may be implemented in combination with other program modules. Generally, program modules include routines, programs, components, data structures, etc. that performs particular tasks or implement particular abstract data types.

Moreover, those skilled in the art will appreciate that the invention may be practiced with other computer system configurations, including hand-held devices, multiprocessor systems, microprocessor-based or programmable consumer electronics, minicomputers/servers, workstations, mainframe computers, and the like.

The invention may also be practiced in distributed computing environments where tasks are performed by remote processing devices that are linked through a communications network. In a distributed computing environment, program modules may be located in both local and remote memory storage devices.

Then invention generally relates to an expert system for product selection. The process aspects of the invention are a series of process steps utilizing, in whole or in part, the system herein and variations thereof. As would be clear to one skilled in the art, the process steps can be embodied in part as code for a computer program for operation on a conventional programmed digital computer, such as a client and server. The program code can be embodied as a computer program on a computer-readable storage medium or as a computer data signal in a carrier wave transmitted over a network.

B. Detailed Description

Figure 1:
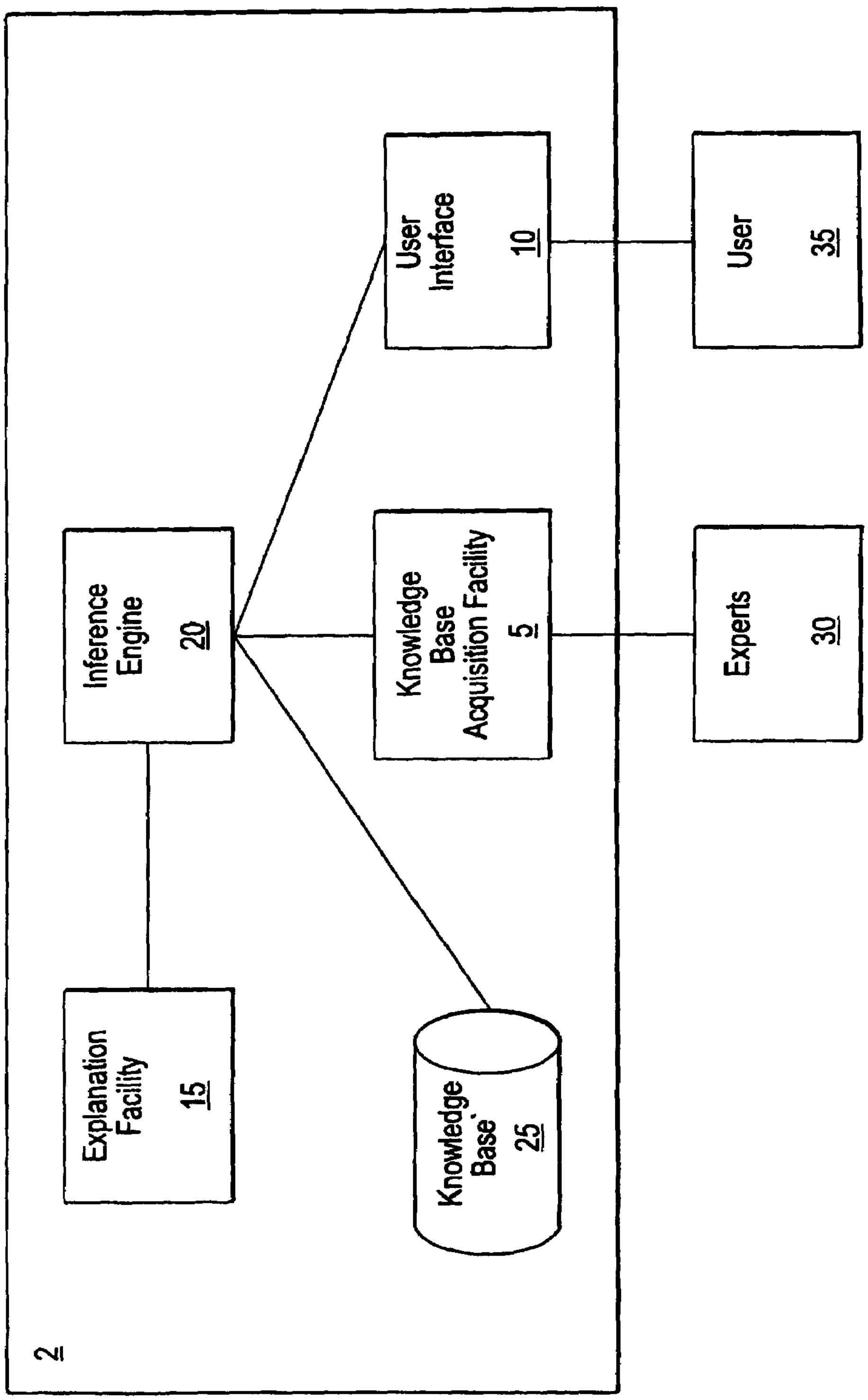
FIG. 1 depicts in one embodiment a schematic diagram of an exemplary expert system.

FIG. 1 depicts in one embodiment a schematic diagram of an exemplary expert system. Experts 30 and users 25 interact with Expert System 2. User interaction is via User interface 10. Expert interaction is via an expert interface which is part of Knowledge Base Acquisition Facility 5. The expert knowledge acquired via the Knowledge Base Acquisition Facility 5 is stored in Knowledge Base 25. Upon User 35 interaction with the Expert System 2, an Inference Engine 20, makes inferences from the information gathered from the user in order to interact with Knowledge Base 25 and return advice to the User. An optional Explanation Facility 15 provides the User 35 some explanation of why the particular advice was given.

Figure 2:
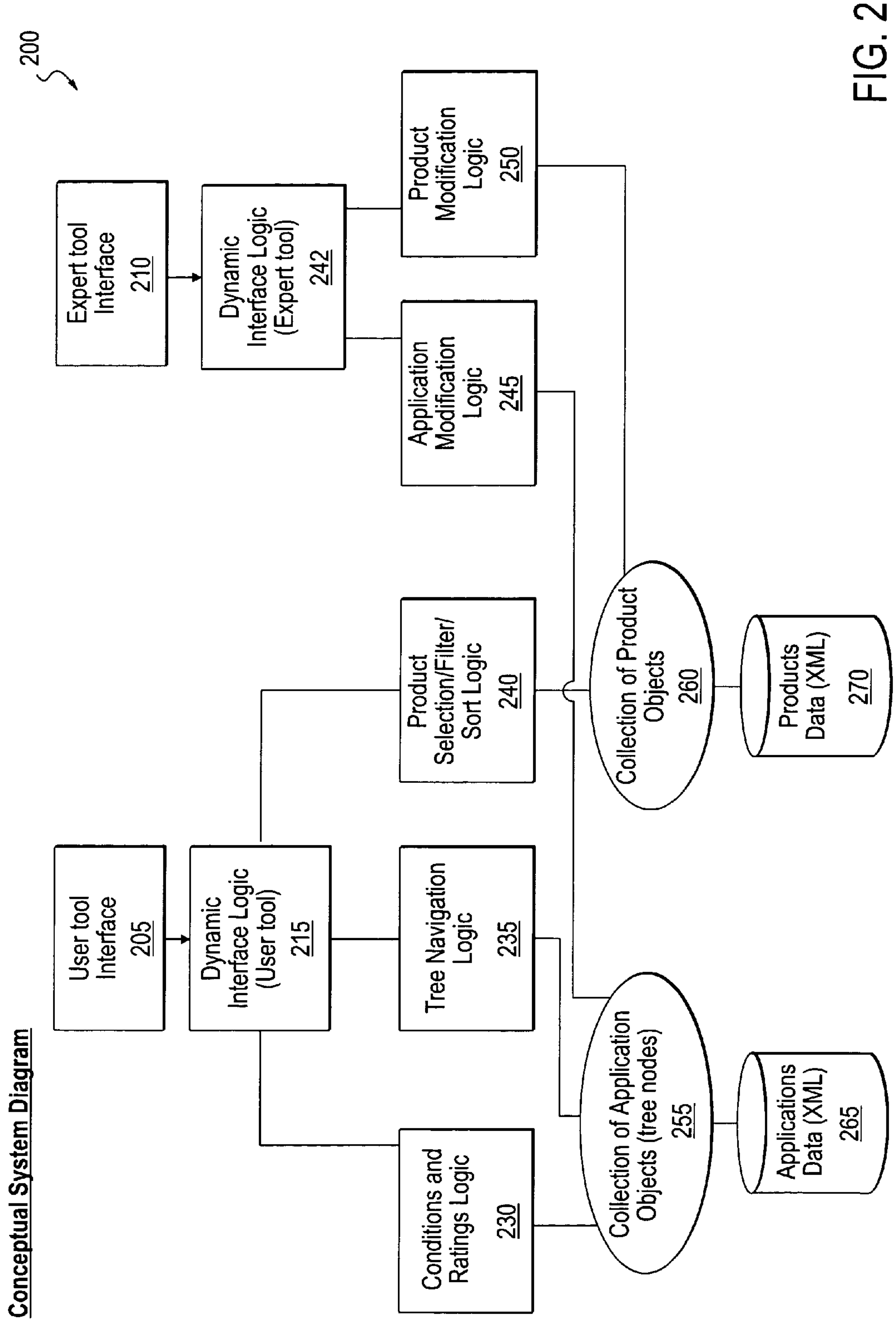
FIG. 2 depicts in one embodiment a schematic system diagram of the invention.

FIG. 2 depicts in one embodiment a schematic system diagram of the invention. The components are Applications Data 265, Collection of Application Objects 255, Products Data 270, and Collection of Product Objects 260 store the knowledge base. Applications Data 265 and Products Data 270 represent the knowledge base stored in long term durable memory such as hard disk drive. Collection of Application Objects 255 and Collection of Product Objects represent the knowledge base in an object-oriented format loaded in computer volatile memory during use of the system.

User tool Interface 205 and Dynamic Interface Logic (User tool) 215 are the user interface. Conditions and Ratings Logic 230, Tree Navigation Logic 235, and Product Selection/Filter/Sort Logic 230 are the inference engine. Expert tool Interface 210, Dynamic Interface Logic (Expert tool) 242, Application Modification Logic 245, and Product Modification Logic 250 are the knowledge base acquisition facility. An optional explanation facility (not shown) may be included.

Figure 3:
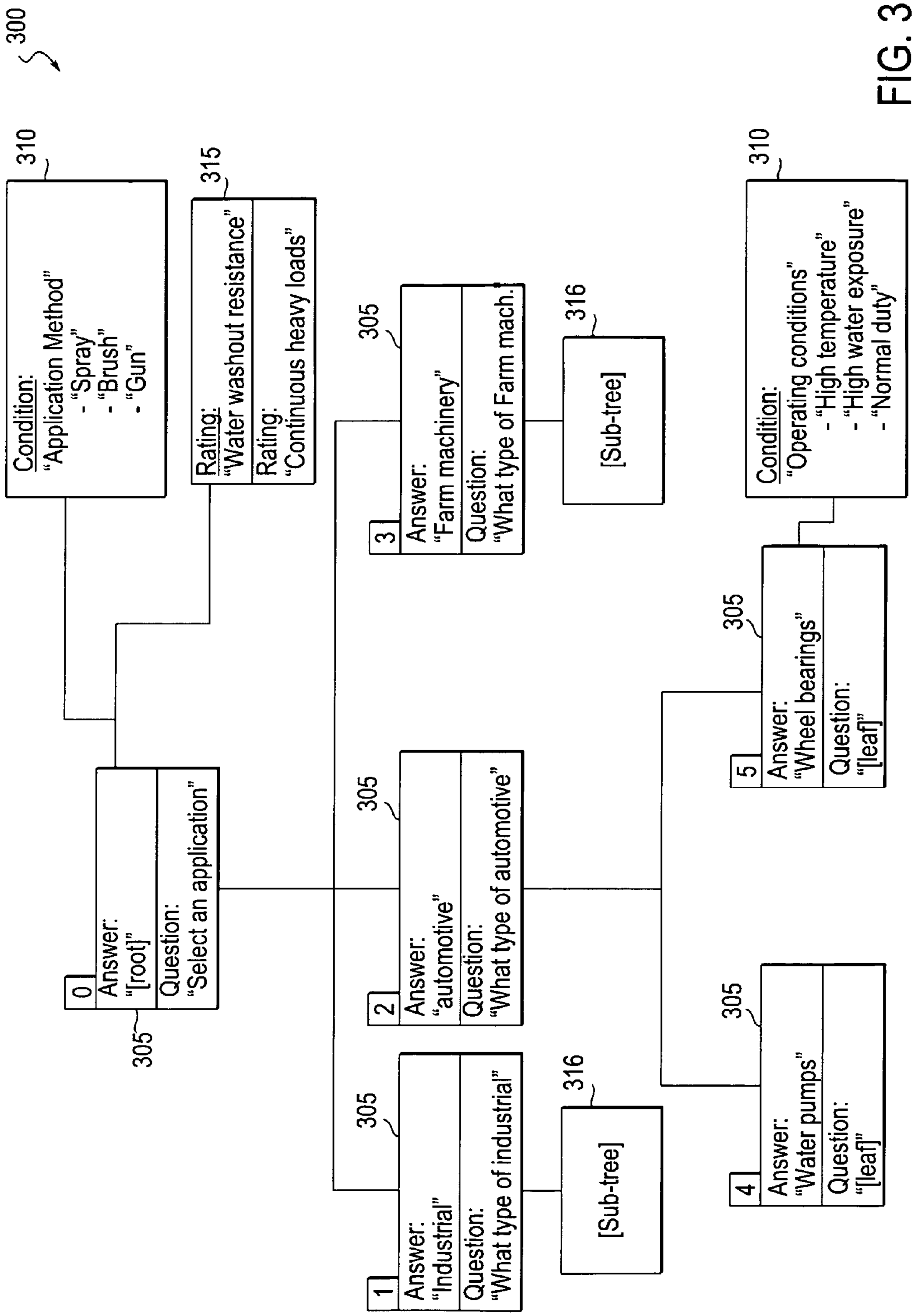
FIG. 3 depicts in one embodiment a schematic system diagram of the tree aspect of the invention.

FIG. 3 depicts in one embodiment a schematic system diagram of the tree aspect of the invention. A portion of the expert knowledge of the expert system of this invention is acquired via creation of, and stored in, a data tree structure. The tree structure contains the expert knowledge of the application space for a broad class of products; i.e., type of application and operating conditions. Example depicting the possible product applications organized in a tree structure. The tree can be of arbitrary hierarchical shape. Each node in the tree has a question that will be asked of the user (blank for leaf nodes) and an answer (blank for the root node) corresponding to the previous question asked. The graphical interface will lead the user through one path in this tree from the root to a leaf node. Nodes may also have "conditions" and/or "ratings" attached to them. After the user reaches a leaf node in the tree, the conditions and ratings that were attached along the path just traversed will be displayed on the graphical interface.

The tree structure may be any now known or later developed data tree structure, including binary trees or multi-trees. The selected structure should be selected for the best fit of the applications and products being included in the expert system. Depicted tree 300 is a multi-tree, i.e., each node 305 may have more than 2 branches. Except for the root node 0, each node has one parent node. Except for the leaf nodes (4, 5), each node 305 has at least one child node. Each node stores information to identify its parent and child nodes, as applicable.

Each node, except the root node 0, contains a question for selection of a product application. The range of allowable answers to the question equate to the child nodes of the node in question. When an answer to the node's question is selected, the active node moves to the node associated with the answer. This repeats, thus reaching finer and finer refinements of product application, until a leaf node is reached. By means of the product data structure, discussed below, each leaf node is effectively associated with one or more products that are suitable for the product application represented via the leaf node.

All nodes 305 may store information representing one or more condition questions 310 representing the conditions under which the finally selected product(s) is intended to be used. As the user selects a path from the root node 0 to a leaf node (4, 5), the condition questions 310 stored in each node along that path are collected for display to the user and use by the expert system in selecting a product. Additionally, each node may store one or more rating questions 315 which are also collected for later display to the user and use by the expert system in scoring and ranking a product.

FIG. 4 depicts in one embodiment an exemplary XML file implementation of the tree structure, i.e., the application tree structure, aspect of the invention. FIG. 5 depicts in one embodiment an exemplary XML file implementation of the product data and its association with the application tree data. The application expert knowledge and product expert knowledge are maintained separately such that they may be edited and managed independently. The application knowledge is entirely independent of the product knowledge. The product knowledge references data in the application knowledge; i.e., each product references suitable applications, valid operating conditions, and expert determined rating scores. Many other data structure implementations of each are possible as known in the art, such as objects, abstract data structures, multi-dimensional arrays, linked lists, and various relational database implementations.

FIG. 6 depicts in one embodiment a schematic process flow diagram for the expert-interface aspect of the invention. After Begin step 603 an expert may chose at Edit Expert Knowledge Base choice step 606 to edit the applications or products aspects of the expert knowledge base. If applications is chosen the experts moves to the Display Application Editor step 609. The expert may select to add a new application or edit an existing one and is passed accordingly to the Add Application to application tree step 612 or the Select existing application in tree step 615.

If edit an existing application is selected, the expert then selects from Create new Condition step 618 and Create new Rating step 621. For either, the expert then enters the Associate condition/rating with the tree node step 624. Lastly, the expert enters the Save Data step 627.

If the expert chooses to edit the products, he/she is passed to the Display Product Editor step 630. The expert then chooses from the Create a new Product step 633, Assign product to applications step 636, Select valid conditions step 639, and Assign performance ratings step 642. Lastly, the expert enters the Save Data step 645, and ends 648.

FIG. 7 depicts in one embodiment a schematic process flow diagram for the user-interface aspect of the invention.

After Begin 703, the user enters Answer application question (navigate the tree) step 706. After each answer question step, the system tests if the user is at a leaf node via the Application fully specified (tree leaf node) choice step 709. If not, user is returned to the answer application step 706. If at a leaf node, the system Display relevant conditions and ratings (also referred to as product usability suitability indicators) at step 712. User enters the Select Condition answer step 715, then the Specify rating preference step 718, and optionally the Change an application answer step 721. According the user's selections in the previous steps, the system performs the Filter Products step 724, Score Products step 727, and the Update Product display step 731. At any time, a user may change an application answer, change or add a condition choice, or change a rating. The applicable products list will then be immediately updated and rescored providing instant feedback to the user. A user optionally may Review report and web links at step 734, and then ends 737.

Figure 9:
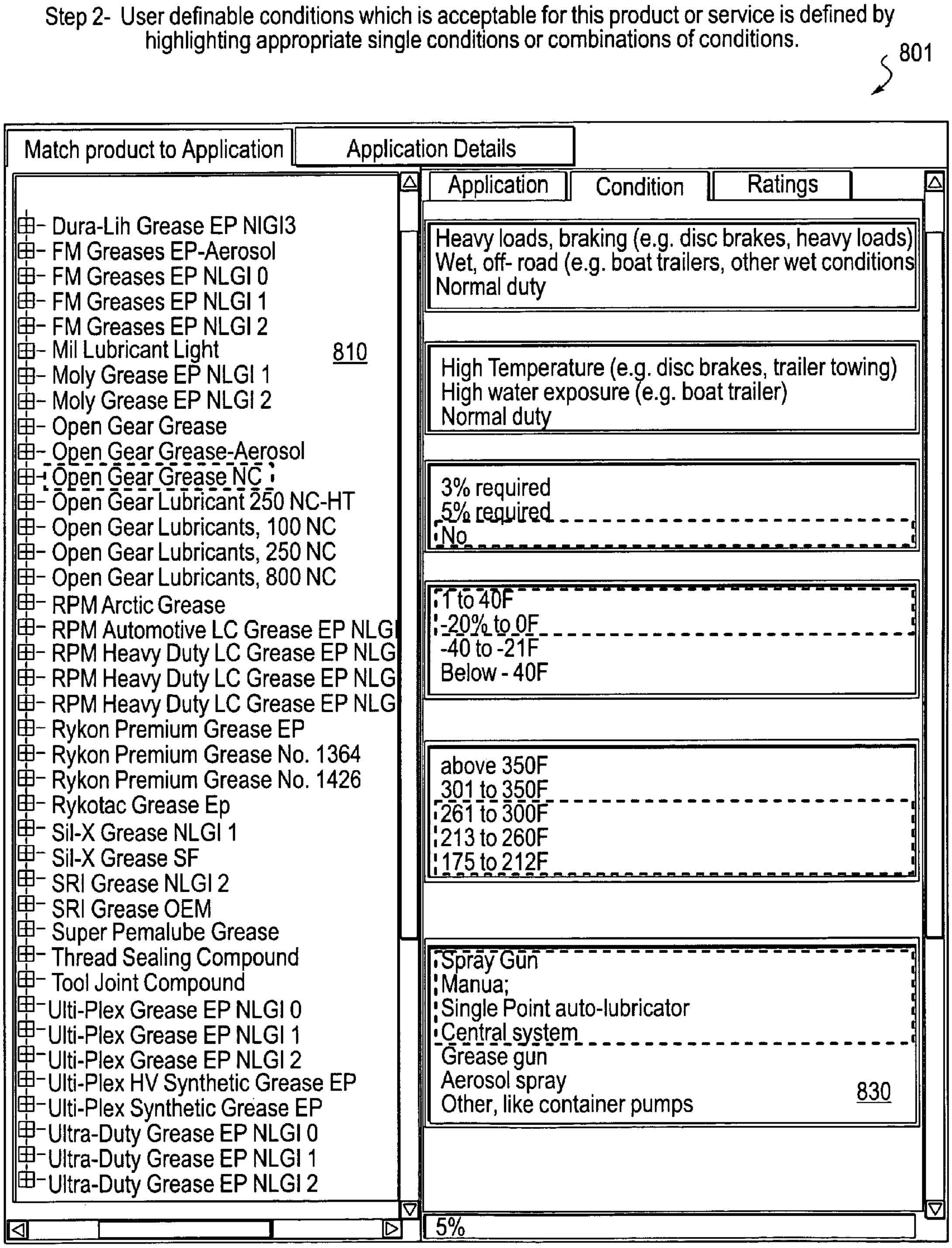
Figure 10:
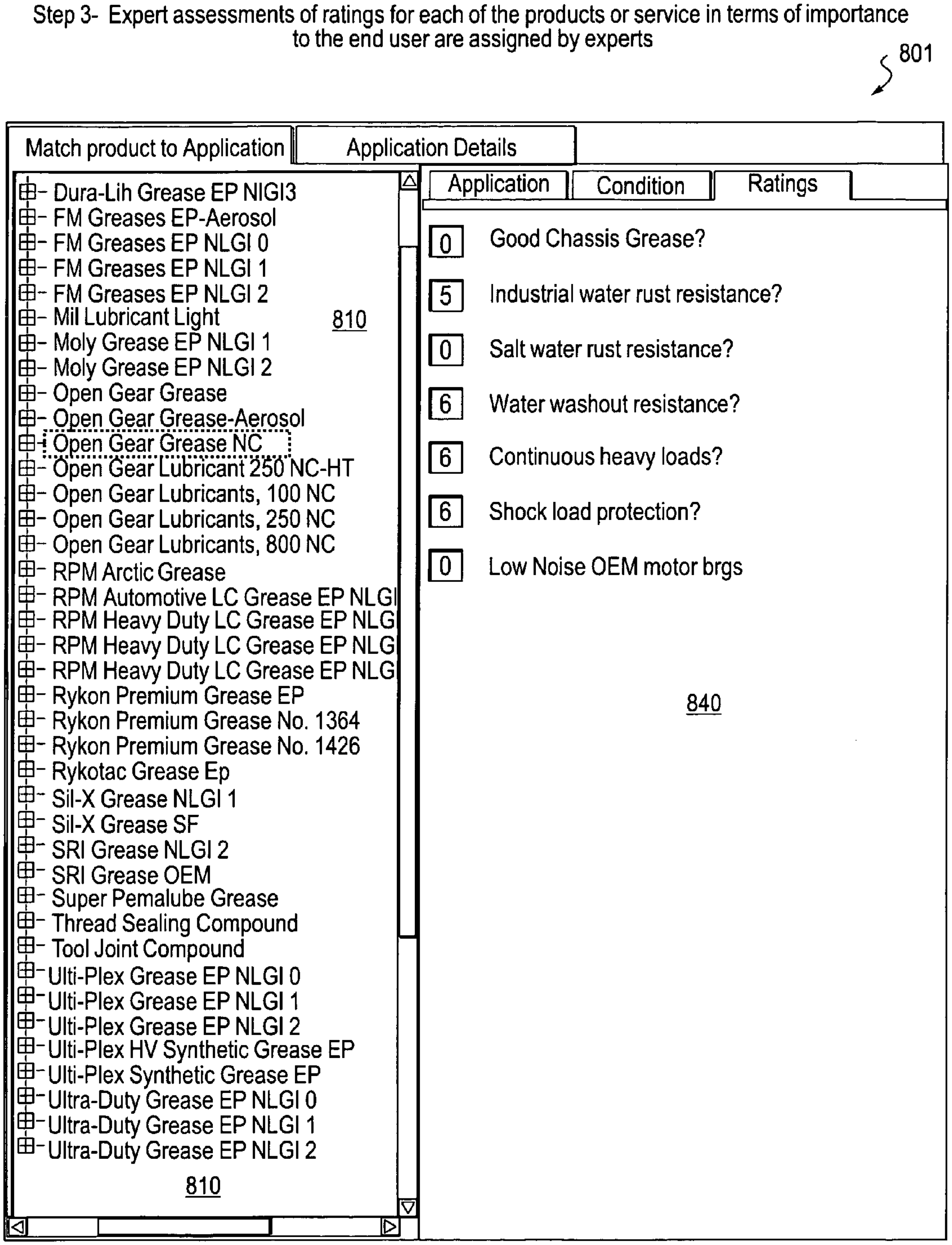
Figure 11:
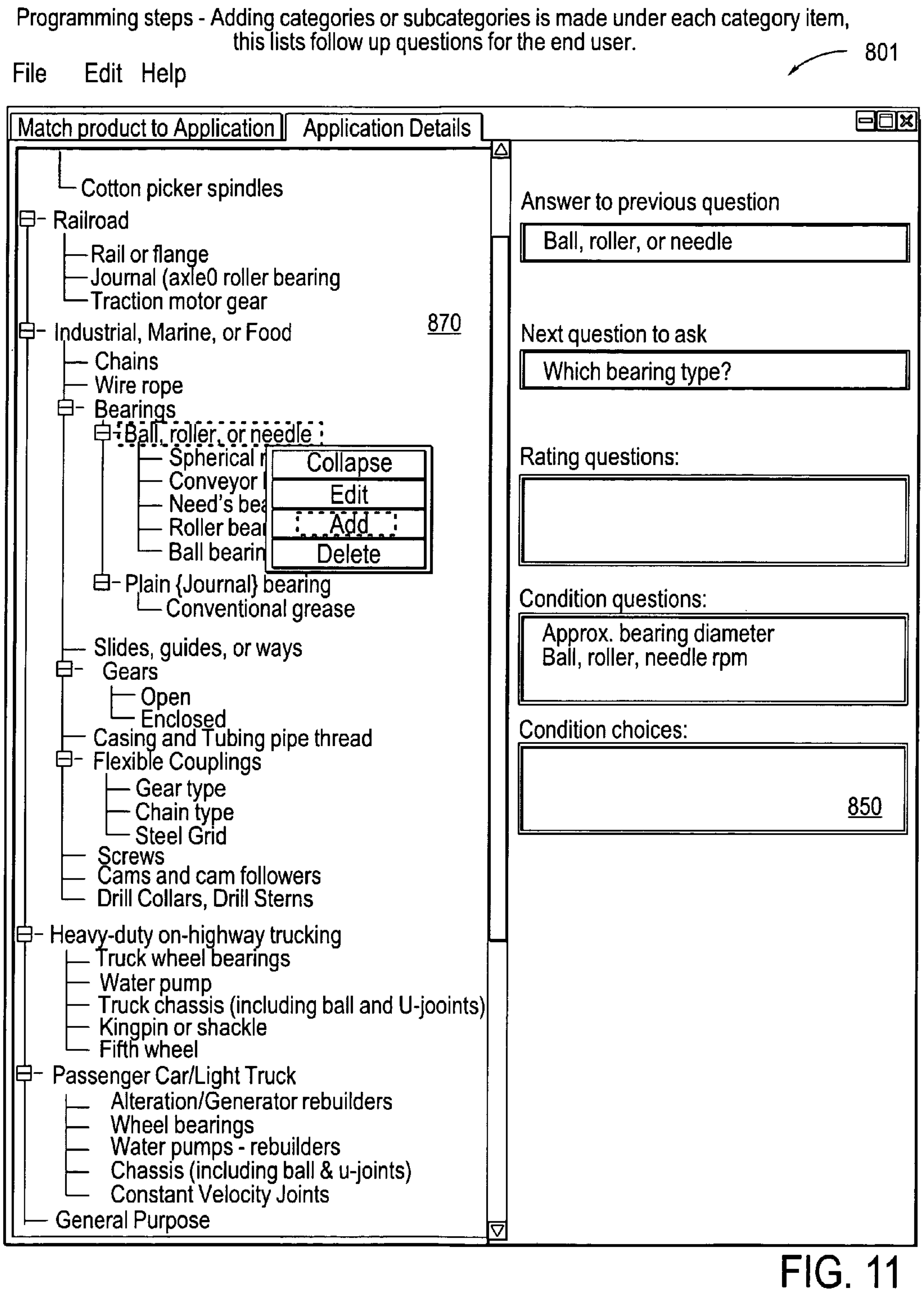
Figure 12:
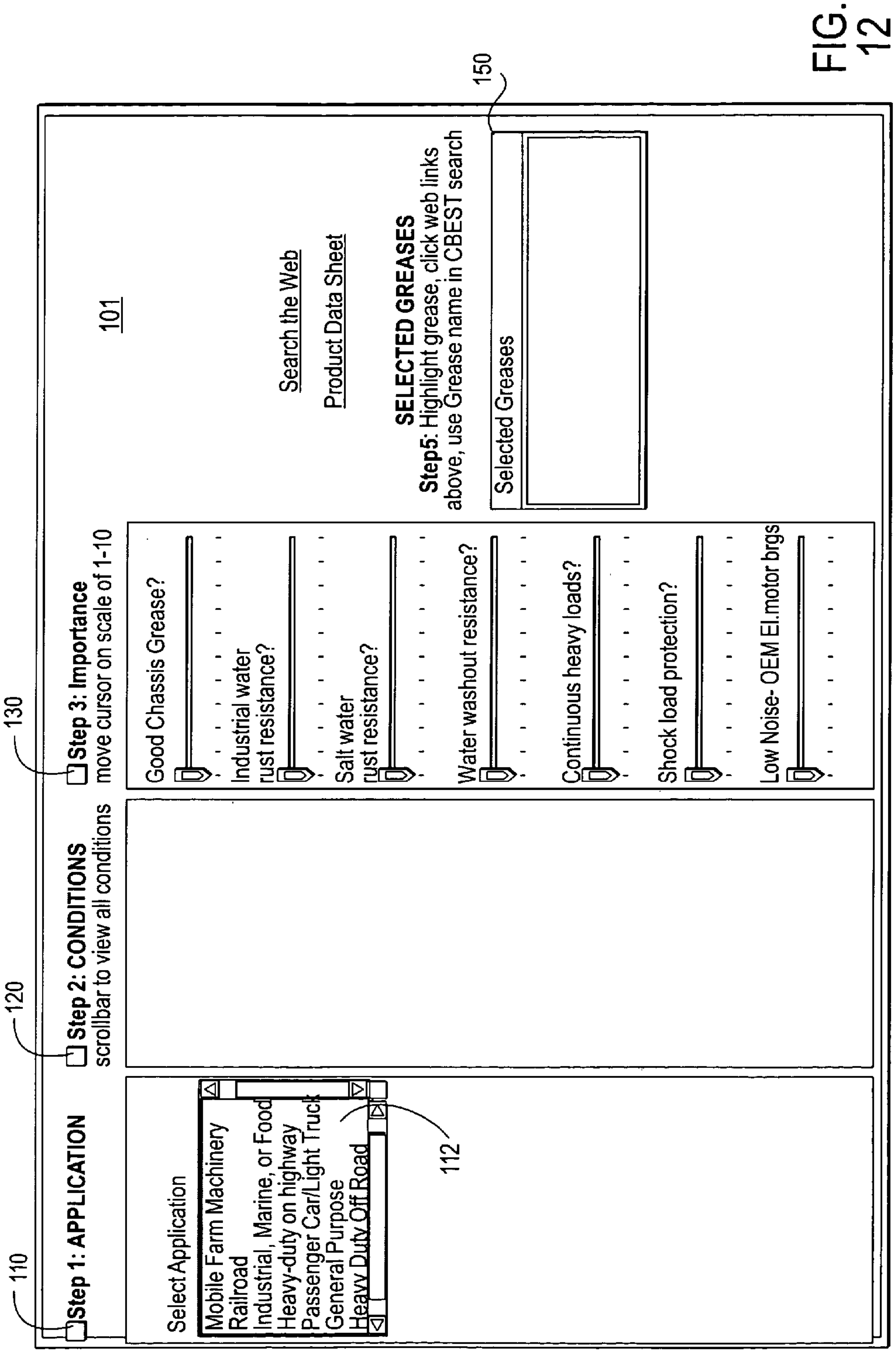
Figure 13:
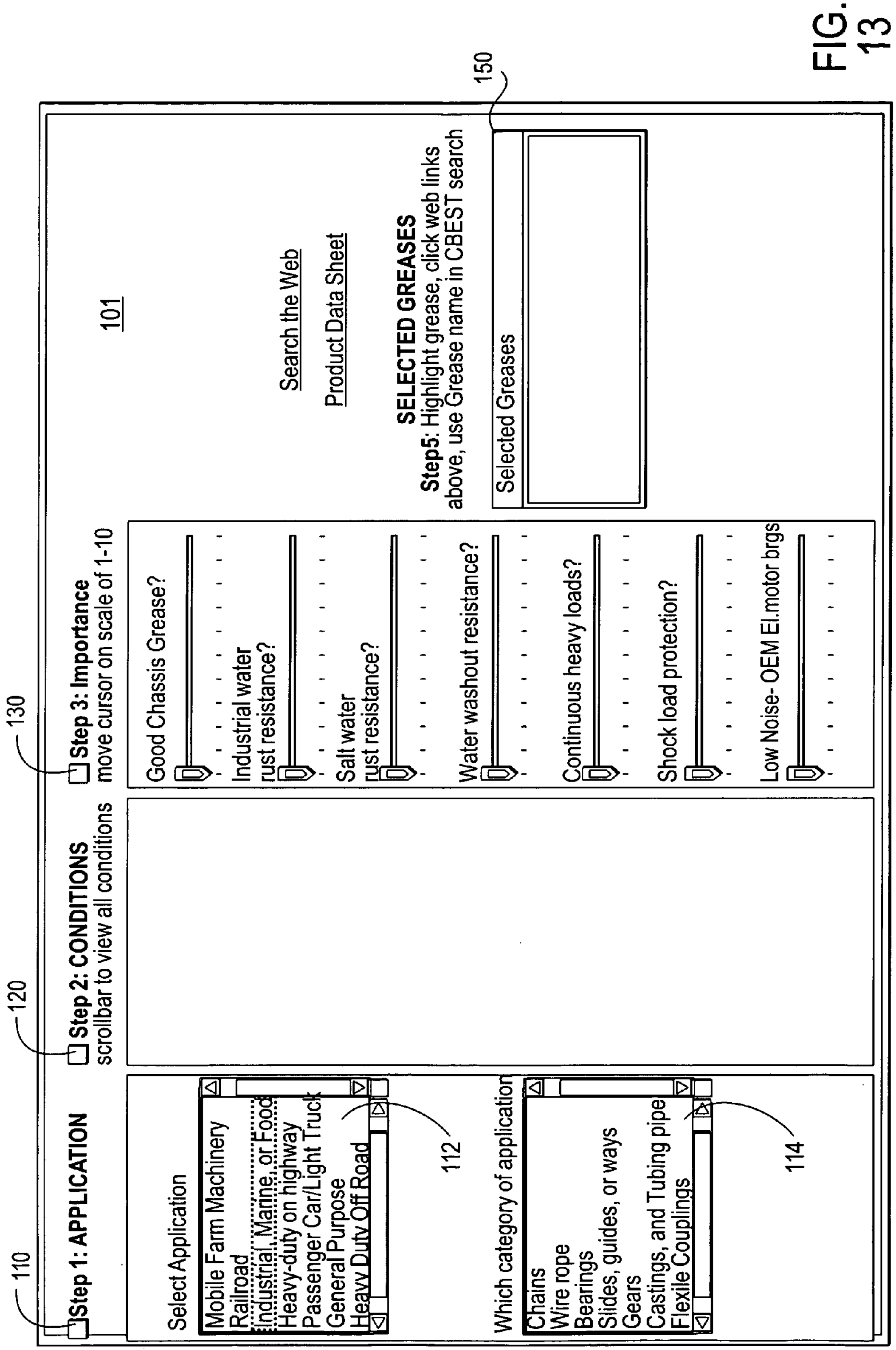
Figure 14:
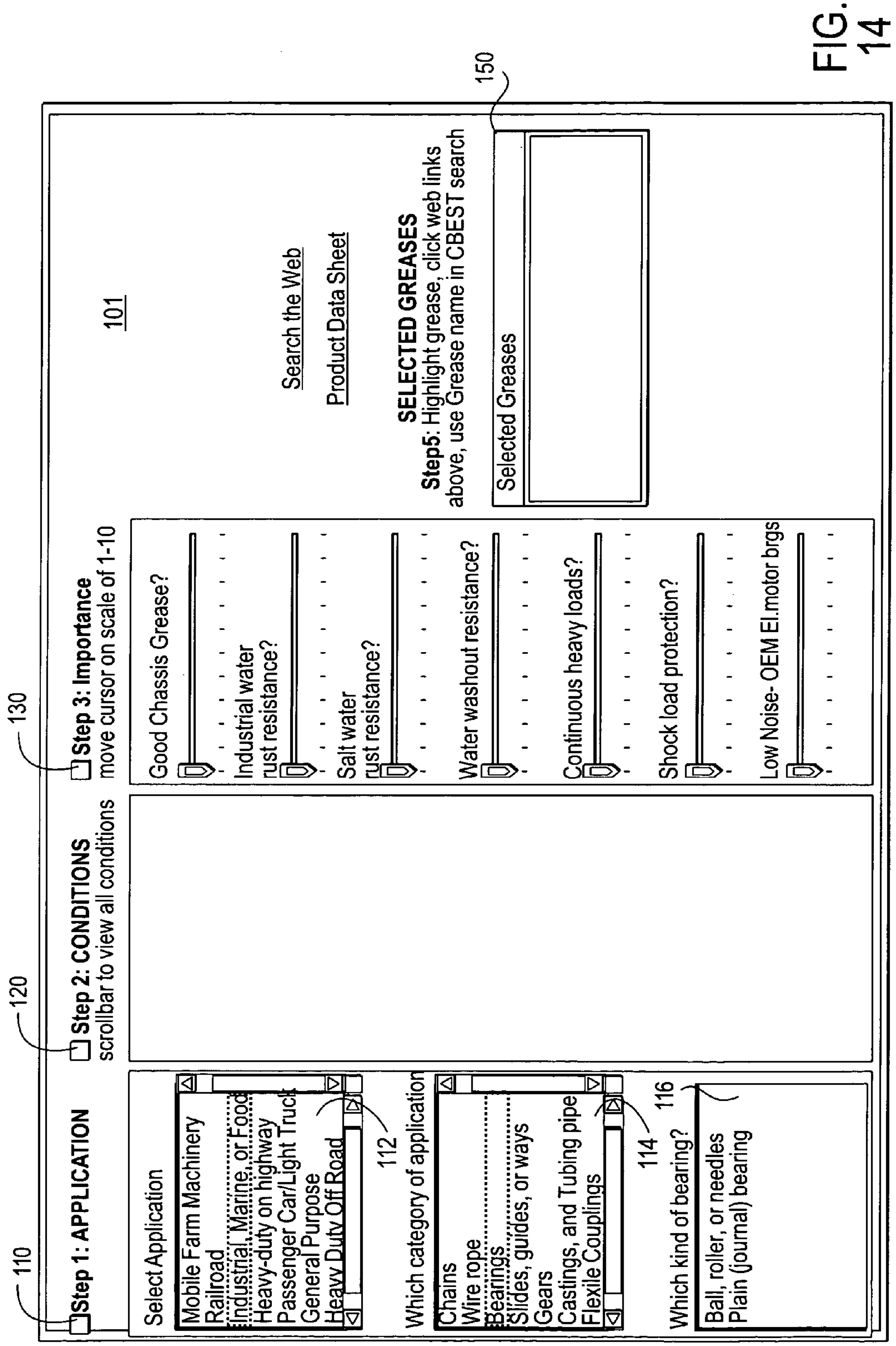
Figure 15:
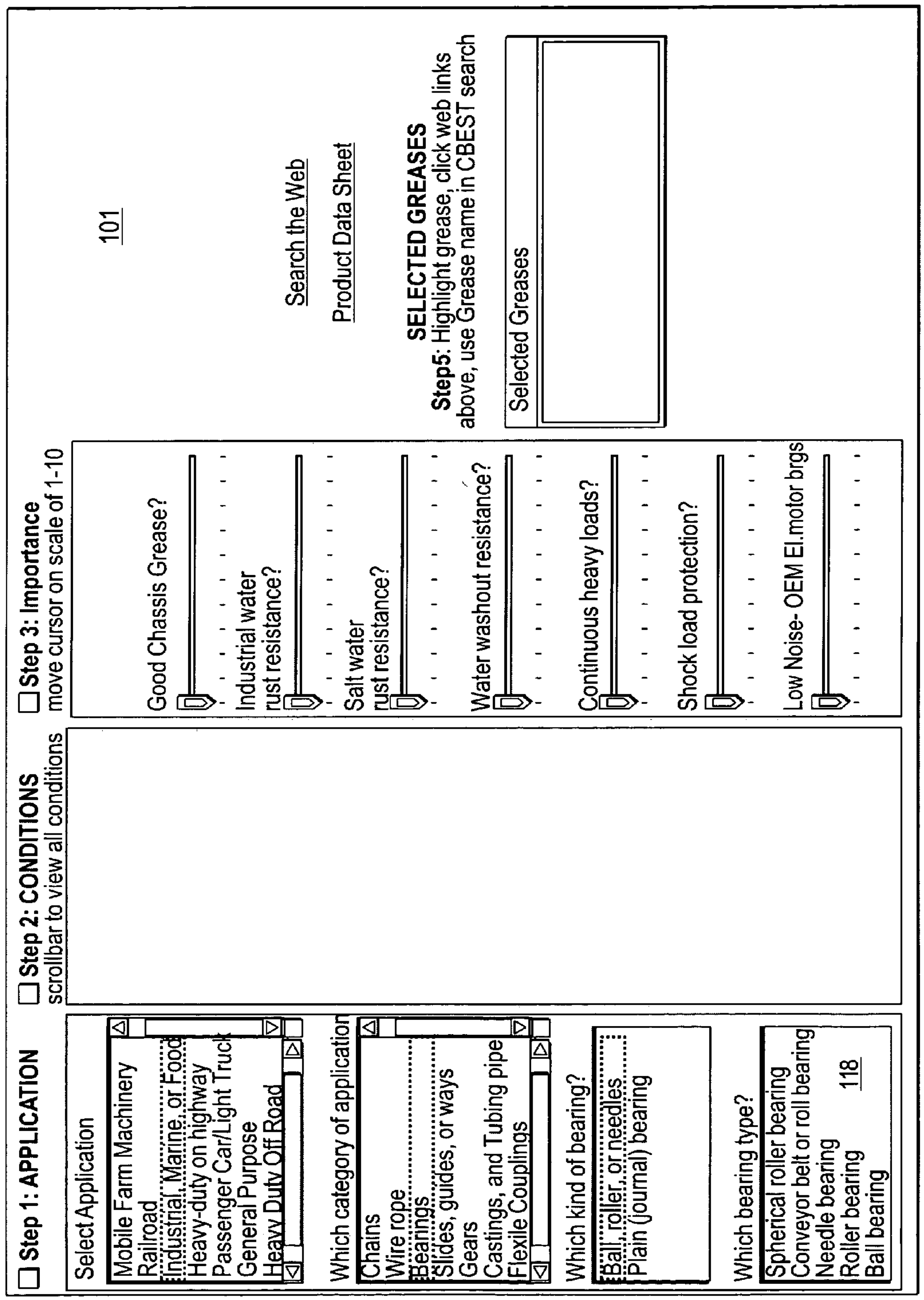
Figure 16:
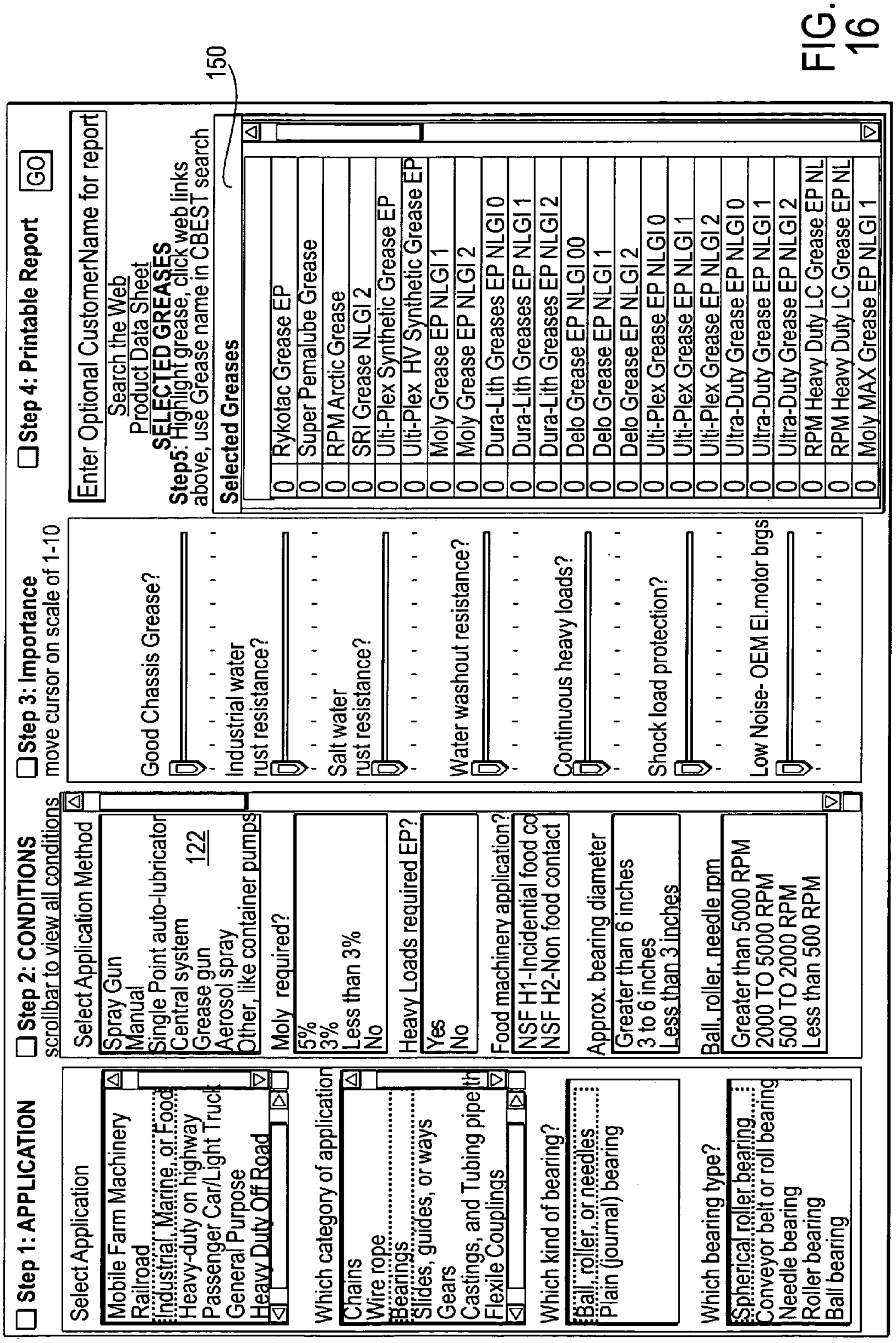
Figure 17:
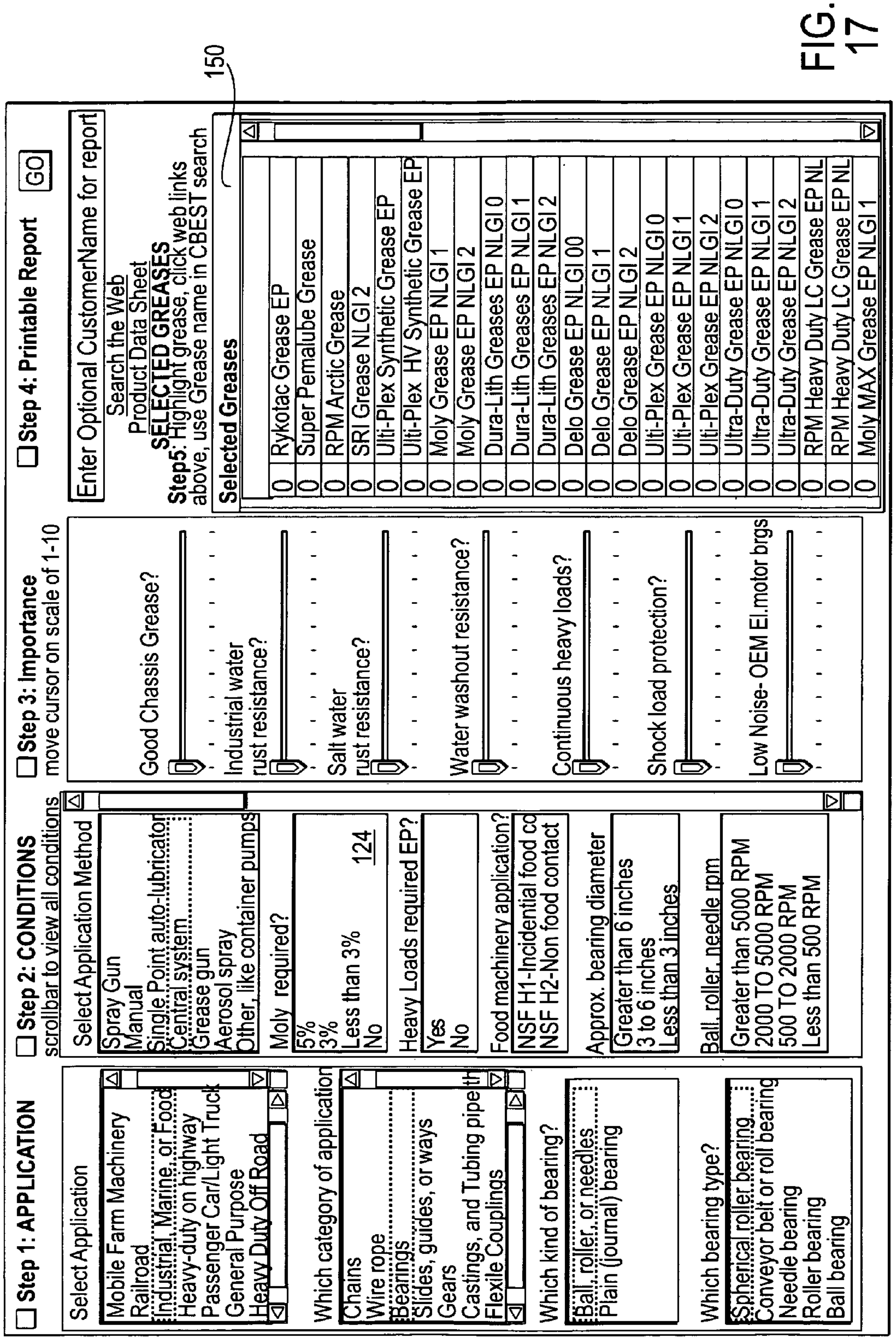
Figure 18:
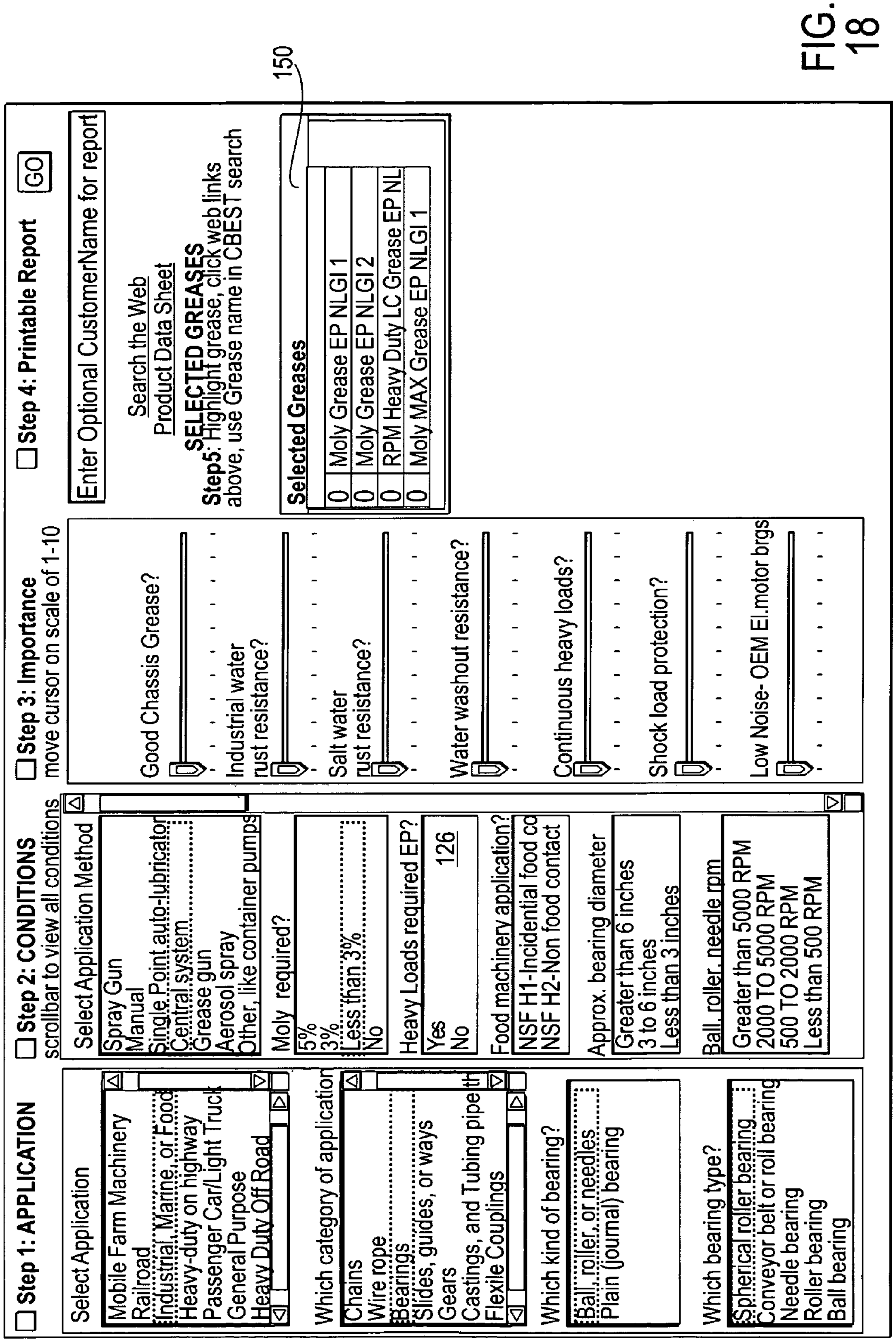
Figure 19:
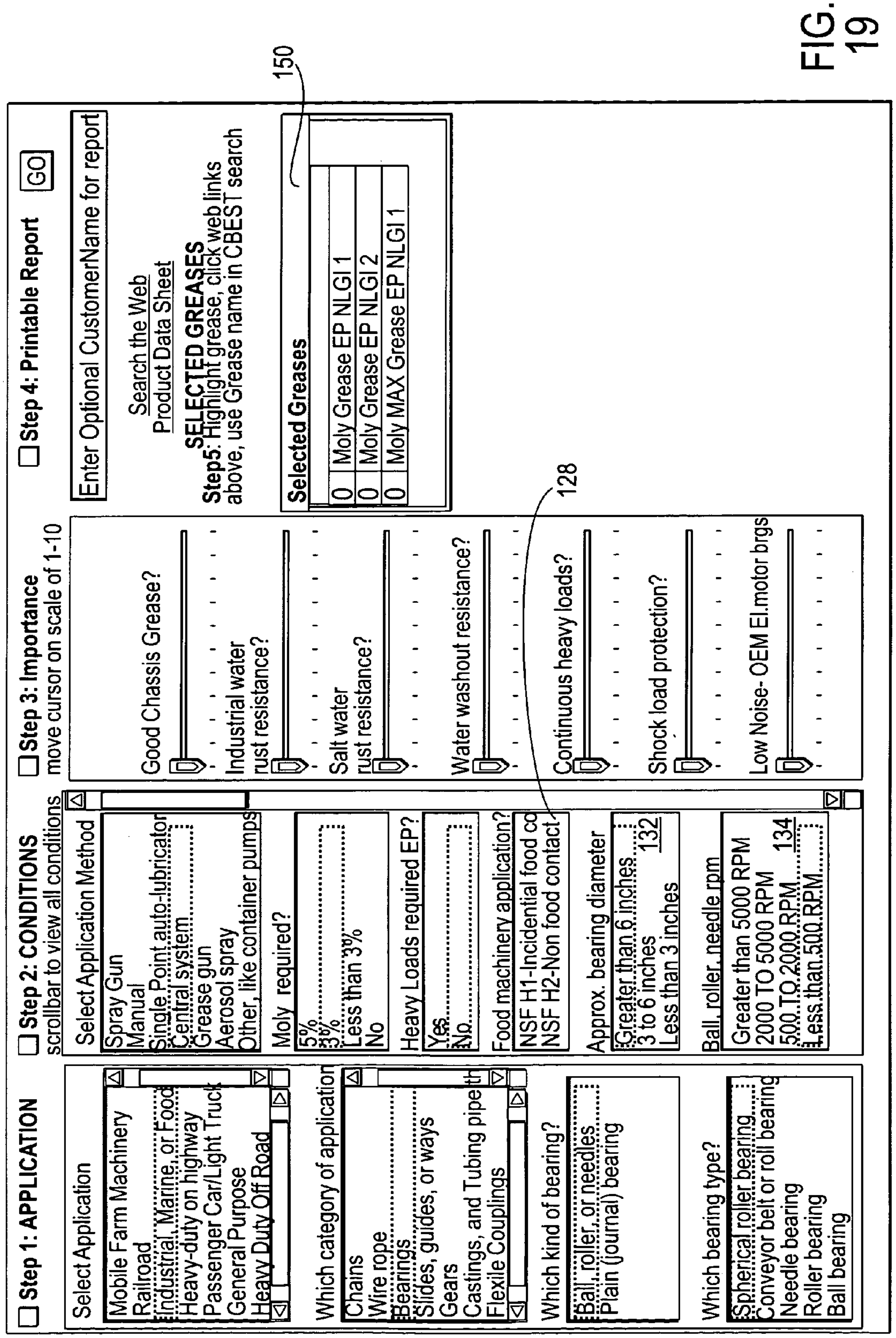
Figure 20:
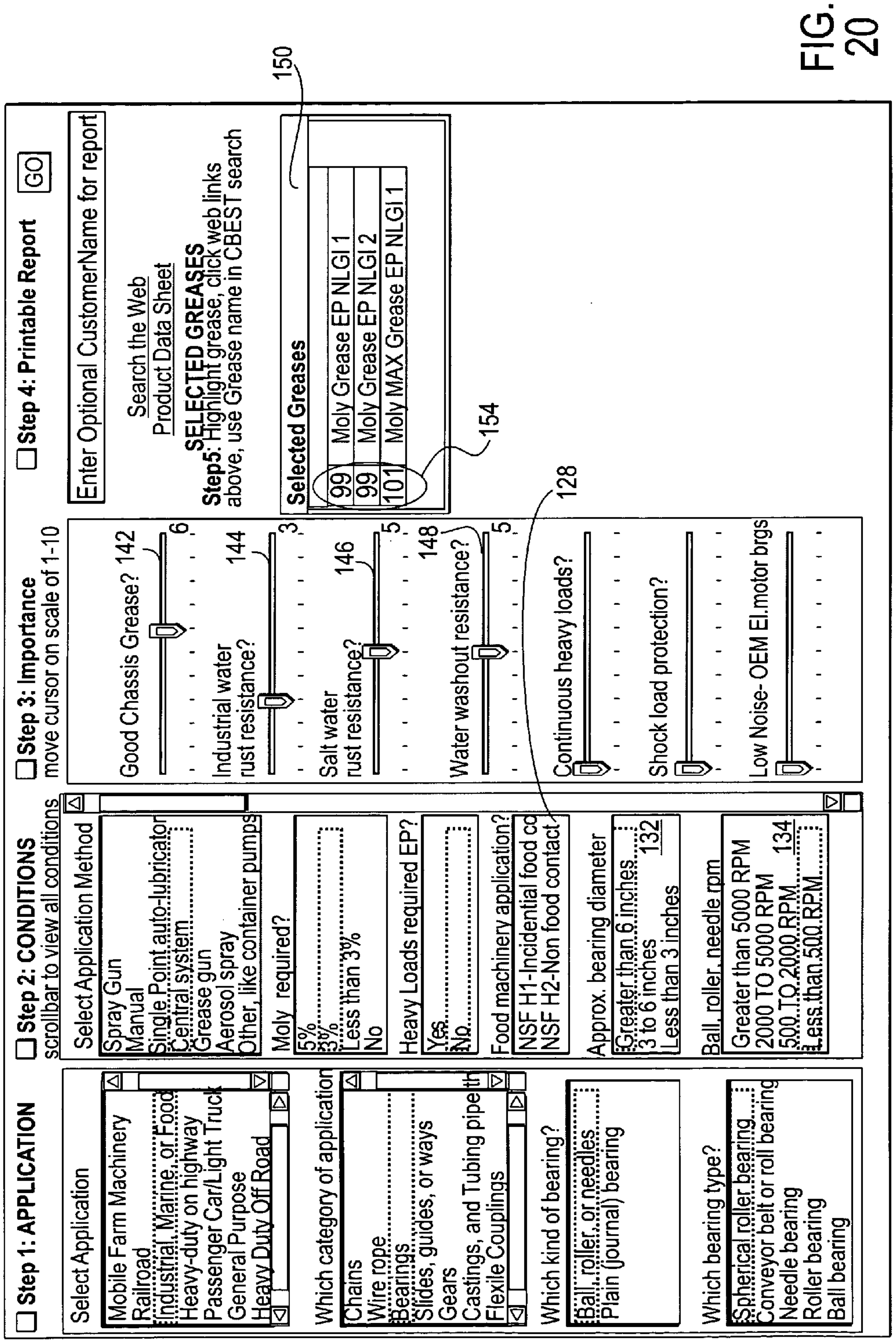

FIG. 8–11 depict in one embodiment exemplary screen shots of the expert-interface aspect of the invention. This aspect of the Expert Interface 801 has products list 810, add grease tool 860, and applications tree structure 820. From this screen an expert enters expert knowledge, e.g., by adding a new product via tool 860 and selects applications via check boxes in the application tree 820. In FIG. 9, the expert then may add use conditions associated with applications for the product via selection boxes 830. Then, in FIG. 10, the expert may add ratings expert knowledge via text boxes in tool 840. These, e.g., are the expert's opinion of suitability for the indicated use on a scale of 1–10 with 10 being very suitable. FIG. 11 depicts application tree 870, now on the left side of the window and in a different form than in FIG. 8. Here, in text boxes 850, the expert may edit the questions and answers associated with each application, which is effectively modifying the structure of the applications tree.

Figure 21:
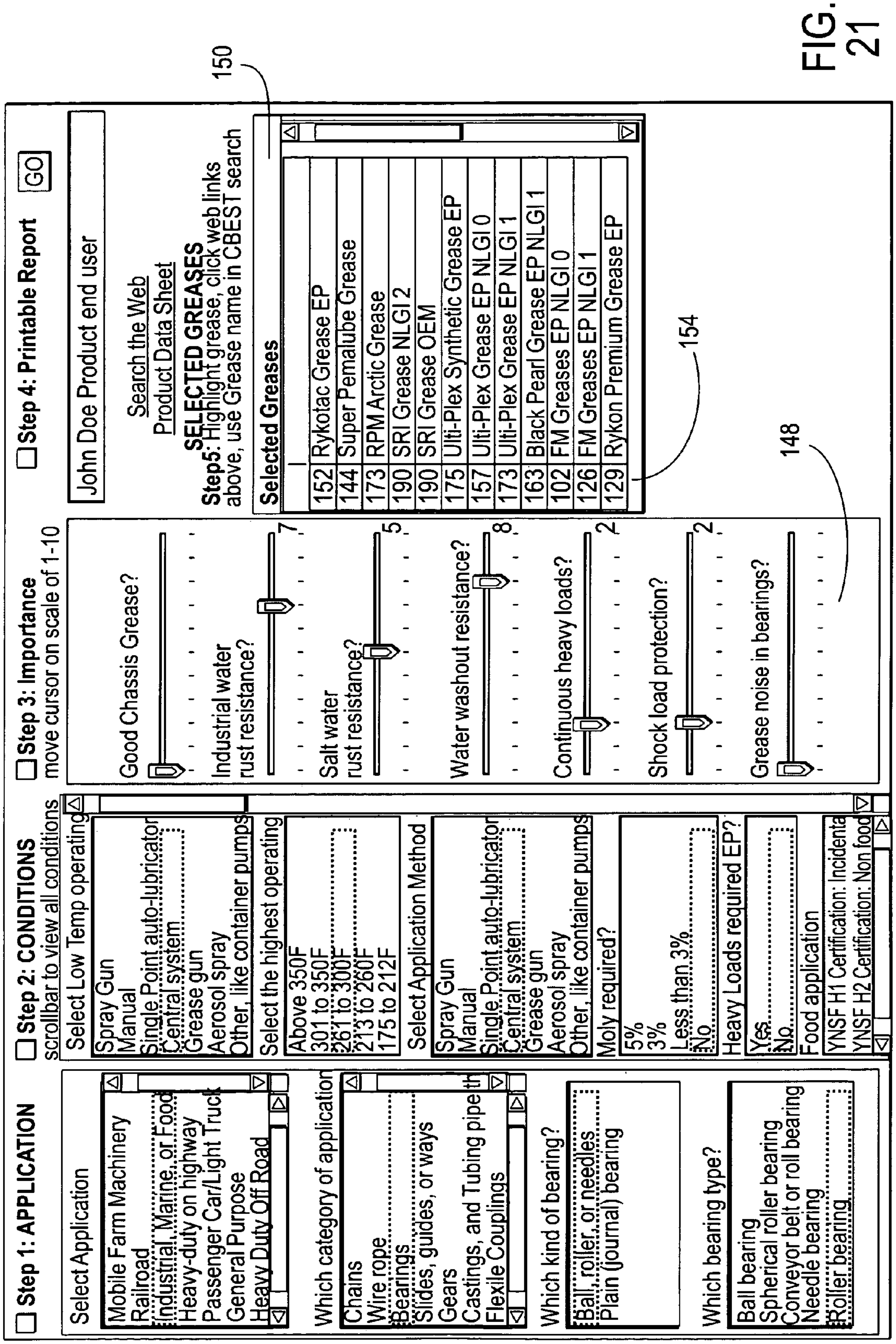

FIG. 12–21 depict in one embodiment exemplary screen shots of the user-interface aspect of the invention. Each Figure shows in succession the progress made as a user selects a path through the tree via text list selection boxes 110, 112, 114, 116, 118, then selects conditions via text list boxes 120, and rates priorities via product usability suitability indicators via slide selectors 130. In selecting a path through the tree, as the user answers a question regarding the intended application a new interactive user interface element, e.g., drop-down box, radio buttons, or other suitable graphic user interface component allowing selecting items from a list, depicting the corresponding child. A listing of suitable greases 150 is displayed based on selections made by the user. The list may change after each user selection if according to the expert knowledge base the suitable products change. The total score resulting from the user's selection of product usability suitability indicators is displayed 148 next to product names in list 150. Any suitable scoring algorithm may be used. One preferred algorithm is to multiply the expert's suitability rating by the user's suitability rating for each use and then add the sum of those products to obtain a final score. FIG. 21 shows how different selections can result in a much wider range of final scores.

C. Other Implementation Details

1. Terms

The detailed description contained herein is represented partly in terms of processes and symbolic representations of operations by a conventional computer and/or wired or wireless network. The processes and operations performed by the computer include the manipulation of signals by a processor and the maintenance of these signals within data packets and data structures resident in one or more media within memory storage devices. Generally, a "data structure" is an organizational scheme applied to data or an object so that specific operations can be performed upon that data or modules of data so that specific relationships are established between organized parts of the data structure.

A "data packet" is type of data structure having one or more related fields, which are collectively defined as a unit of information transmitted from one device or program module to another. Thus, the symbolic representations of operations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, data, packets, nodes, numbers, points, entries, objects, images, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as issuing, sending, altering, adding, disabling, determining, comparing, reporting, and the like, which are often associated with manual operations performed by a human operator. The operations described herein are machine operations performed in conjunction with various inputs provided by a human operator or user that interacts with the computer.

2. Hardware

It should be understood that the programs, processes, methods, etc. described herein are not related or limited to any particular computer or apparatus, nor are they related or limited to any particular communication architecture, other than as described. Rather, various types of general purpose machines, sensors, transmitters, receivers, transceivers, and network physical layers may be used with any program modules and any other aspects of the invention constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read-only memory.

3. Program

In the preferred embodiment where any steps of the present invention are embodied in machine-executable instructions, the instructions can be used to cause a general-purpose or special-purpose processor which is programmed with the instructions to perform the steps of the present invention. Alternatively, the steps of the present invention might be performed by specific hardware components that contain hardwired logic for performing the steps, or by any combination of programmed computer components and custom hardware components.

The foregoing system may be conveniently implemented in a program or program module(s) that is based upon the diagrams and descriptions in this specification. No particular programming language has been required for carrying out the various procedures described above because it is considered that the operations, steps, and procedures described above and illustrated in the accompanying drawings are sufficiently disclosed to permit one of ordinary skill in the art to practice the present invention.

Moreover, there are many computers, computer languages, and operating systems which may be used in practicing the present invention and therefore no detailed computer program could be provided which would be applicable to all of these many different systems. Each user of a particular computer will be aware of the language and tools which are most useful for that user's needs and purposes.

The invention thus can be implemented by programmers of ordinary skill in the art without undue experimentation after understanding the description herein.

4. Product

The present invention is composed of hardware and computer program products which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, the software portion of the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

5. Components

The major components (also interchangeably called aspects, subsystems, modules, functions, services) of the system and method of the invention, and examples of advantages they provide, are described herein with reference to the figures. For figures including process/means blocks, each block, separately or in combination, is alternatively computer implemented, computer assisted, and/or human implemented. Computer implementation optionally includes one or more conventional general purpose computers having a processor, memory, storage, input devices, output devices and/or conventional networking devices, protocols, and/or conventional client-server hardware and software. Where any block or combination of blocks is computer implemented, it is done optionally by conventional means, whereby one skilled in the art of computer implementation could utilize conventional algorithms, components, and devices to implement the requirements and design of the invention provided herein. However, the invention also includes any new, unconventional implementation means.

6. Web Design

Any web site aspects/implementations of the system include conventional web site development considerations known to experienced web site developers. Such considerations include content, content clearing, presentation of content, architecture, database linking, external web site linking, number of pages, overall size and storage requirements, maintainability, access speed, use of graphics, choice of metatags to facilitate hits, privacy considerations, and disclaimers.

7. Other Implementations

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A system for product selection, the system comprising:

a. a CPU;

b. a memory operatively connected to the CPU, the memory containing a program adapted to be executed by the CPU and the CPU and memory cooperatively adapted for presenting a user interface and expert interface to an expert system for product selection;

c. an expert-interface code segment embodied on a computer-readable medium configured and adapted for:

i. creating and modifying via a graphical user interface a graphically-displayed tree structure representing a plurality of product applications;

ii. associating and modifying via a graphical user interface one or more use condition with each node of the tree structure; and iii. associating and modifying via a graphical user interface one or more suitability ratings for a plurality of applications;

iv. creating and modifying via a graphical user interface a list of products v. associating and modifying via a graphical user interface one or more product with each leaf node of the tree structure;

vi. associating via a graphical user interface use condition choices with each product vii. associating via a graphical user interface suitability ratings for each product d. a user-interface code segment embodied on a computer-readable medium configured and adapted for i. selecting via a graphical-use interface a path in the tree structure, and for displaying on the same window of the graphical-use interface:

1. the products associated with the leaf node of the selected path;

2. the use conditions associated with each node of the selected path; and 3. the product usability suitability indicators associated with each node of the selected path;

ii. selecting via the same window of the graphical-use interface one or more of the use conditions associated with the nodes of the selected path and for entering the user-defined relative importance of the product usability suitability indicators for the intended application of the products associated with the leaf nodes of the selected path;

iii. comparing the selected use conditions with the displayed products, wherein products not having such selected use conditions as attributes are filtered out of the displayed list of products;

iv. comparing the entered relative importance of the product usability suitability indicators with the product usability suitability indicators associated with the displayed products, associating a score with each displayed product indicating the correlation of the comparison, and displaying the score with the product; and v. printing the resulting product list, corresponding suitability scores, selected tree path, selected use conditions, and entered relative importance of product usability suitability indicators.

2. The system of claim 1, wherein product usability suitability indicators are ranked by user-definable importance factors.

3. The system of claim 1, further comprising printing the resulting product list in sorted order of highest score first.

4. The system of claim 1, wherein the user-interface code segment is real-time, interactive for permitting a user to change one or more selections and to evaluate any resulting changes in the product list.

5. The system of claim 1, wherein the user-interface code segment presents all user selection in a single window permitting a user to change one or more selections in any sequence independent of the order in which the selections where first made.

6. The system of claim 1, further comprising hyperlinks associated with each product in the resulting product list, each hyperlink configured and adapted to retrieve product information regarding the associated product from the Internet or from a database.

7. The system of claim 1, wherein the products associated with each leaf node comprise lubricating products.

8. The system of claim 1, wherein the tree, use conditions, and product usability suitability indicators are configured and adapted to permit performance related matching of lubricating products to individual lubricating needs.

9. A system for product selection, the system comprising:

a. a CPU;

b. a memory operatively connected to the CPU, the memory containing a program adapted to be executed by the CPU and the CPU and memory cooperatively adapted for presenting a user interface and expert interface to an expert system for product selection;

c. an expert-interface code segment embodied on a computer-readable medium configured and adapted for:

i. creating and modifying via a graphical user interface a graphically-displayed tree structure representing a plurality of product applications;

ii. associating and modifying via a graphical user interface one or more product with each leaf node of the tree structure;

iii. associating and modifying via a graphical user interface one or more use condition with each node of the tree structure; and iv. associating and modifying via a graphical user interface with each product usability suitability indicators for a plurality of applications;

d. a user-interface code segment embodied on a computer-readable medium configured and adapted for:

i. selecting via a graphical-use interface a path in the tree structure, and for displaying on the same window of the graphical-use interface:

1. the products associated with the leaf node of the selected path, and hyperlinks associated with each product configured and adapted to retrieve product information regarding the associated product from the Internet or from a database;

2. the use conditions associated with each node of the selected path; and 3. the product usability suitability indicators associated with each node of the selected path, configured and adapted for ranking by user-definable importance factors;

ii. selecting via the same window of the graphical-use interface one or more of the use conditions associated with the nodes of the selected path and for entering the user-defined relative importance of the product usability suitability indicators for the intended application of the products associated with the leaf nodes of the selected path;

iii. comparing the selected use conditions with the displayed products, wherein products not having such selected use conditions as attributes are filtered out of the displayed list of products;

iv. comparing the entered relative importance of the product usability suitability indicators with the product usability suitability indicators associated with the displayed products, associating a score with each displayed product indicating the correlation of the comparison, and displaying the score with the product;

v. printing the resulting product list in sorted order of highest score first, corresponding suitability scores, selected tree path, selected use conditions, and entered relative importance of product usability suitability indicators;

vi. wherein the user-interface code segment is real-time, interactive for permitting a user to change one or more selections and to evaluate any resulting changes in the product list;

vii. wherein the products associated with each leaf node comprise lubricating products; and viii. wherein the tree, use conditions, and product usability suitability indicators are configured and adapted to permit performance related matching of lubricating products to individual lubricating needs.

10. A method for product selection comprising:

a. creating and modifying via a graphical user interface a graphically-displayed tree structure representing a plurality of product applications;

b. associating and modifying via a graphical user interface one or more use condition with each node of the tree structure; and c. associating and modifying via a graphical user interface one or more suitability ratings for a plurality of applications;

d. creating and modifying via a graphical user interface a list of products e. associating and modifying via a graphical user interface one or more product with each leaf node of the tree structure;

f. associating via a graphical user interface use condition choices with each product;

g. associating via a graphical user interface suitability ratings for each product;

h. selecting via a graphical-use interface a path in a tree structure, and for displaying on the same window of the graphical-use interface:

i. the products associated with the leaf node of the selected path;

ii. the use conditions associated with each node of the selected path; and iii. the product usability suitability indicators associated with each node of the selected path;

i. selecting via the same window of the graphical-use interface one or more of the use conditions associated with the nodes of the selected path and for entering the user-defined relative importance of the product usability suitability indicators for the intended application of the products associated with the leaf nodes of the selected path;

l. comparing the selected use conditions with the displayed products, wherein products not having such selected use conditions as attributes are filtered out of the displayed list of products;

m. comparing the entered relative importance of the product usability suitability indicators with the product usability suitability indicators associated with the displayed products, associating a score with each displayed product indicating the correlation of the comparison, and displaying the score with the product; and n. printing the resulting product list, corresponding suitability scores, selected tree path, selected use conditions, and entered relative importance of product usability suitability indicators.

11. The method of claim 1, wherein product usability suitability indicators are ranked by user-definable importance factors.

12. The method of claim 1, further comprising printing the resulting product list in sorted order of highest score first.

13. The method of claim 1, wherein the selecting is real-time, interactive for permitting a user to change one or more selections and to evaluate any resulting changes in the product list.

14. The method of claim 1, further comprising displaying hyperlinks associated with each product in the resulting product list for retrieving product information regarding the associated product from the Internet or from a database.

15. The method of claim 1, wherein the products associated with each leaf node comprise lubricating products.

16. The method of claim 1, wherein the tree, use conditions, and product usability suitability indicators are configured and adapted to permit performance related matching of lubricating products to individual lubricating needs.

17. A method for product selection comprising:

a. creating and modifying via a graphical user interface a graphically-displayed tree structure representing a plurality of product applications;

b. associating and modifying via a graphical user interface one or more use condition with each node of the tree structure; and c. associating and modifying via a graphical user interface one or more suitability ratings for a plurality of applications;

d. creating and modifying via a graphical user interface a list of products e. associating and modifying via a graphical user interface one or more product with each leaf node of the tree structure;

f. associating via a graphical user interface use condition choices with each product;

g. associating via a graphical user interface suitability ratings for each product;

h. selecting via a graphical-use interface a path in a tree structure, and for displaying on the same window of the graphical-use interface:

i. the products associated with the leaf node of the selected path (and);

ii. the use conditions associated with each node of the selected path; and iii. the product usability suitability indicators associated with each node of the selected path for ranking by user-definable important factors;

i. selecting via the same window of the graphical-use interface one or more of the use conditions associated with the nodes of the selected path and for entering the user-defined relative importance of the product usability suitability indicators for the intended application of the products associated with the leaf nodes of the selected path;

l. comparing the selected use conditions with the displayed products, wherein products not having such selected use conditions as attributes are filtered out of the displayed list of products;

m. comparing the entered relative importance of the product usability suitability indicators with the product usability suitability indicators associated with the displayed products, associating a score with each displayed product indicating the correlation of the comparison, and displaying the score with the product; and n. printing the resulting product list in stored order of highest score first, corresponding suitability scores, selected tree path, selected use conditions, and entered relative importance of product usability suitability indicators; and o. wherein user-interface is real-time, interactive for permitting a user to change one or more selections and to evaluate any resulting changes in the product list.

18. A machine-readable program storage medium tangibly embodying sequences of instructions, the sequences of instructions for execution by at least one processing system, the sequences of instructions to perform steps for:

a. creating and modifying via a graphical user interface a graphically-displayed tree structure representing a plurality of product applications;

b. associating and modifying via a graphical user interface one or more use condition with each node of the tree structure; and c. associating and modifying via a graphical user interface one or more suitability ratings for a plurality of applications;

d. creating and modifying via a graphical user interface a list of products e. associating and modifying via a graphical user interface one or more product with each leaf node of the tree structure;

f. associating via a graphical user interface use condition choices with each product;

g. associating via a graphical user interface suitability ratings for each product;

h. selecting via a graphical-use interface a path in a tree structure, and for displaying on the same window of the graphical-use interface:

i. the products associated with the leaf node of the selected path;

ii. the use conditions associated with each node of the selected path; and iii. the product usability suitability indicators associated with each node of the selected path;

i. selecting via the same window of the graphical-use interface one or more of the use conditions associated with the nodes of the selected path and for entering the user-defined relative importance of the product usability suitability indicators for the intended application of the products associated with the leaf nodes of the selected path;

l. comparing the selected use conditions with the displayed products, wherein products not having such selected use conditions as attributes are filtered out of the displayed list of products;

m. comparing the entered relative importance of the product usability suitability indicators with the product usability suitability indicators associated with the displayed products, associating a score with each displayed product indicating the correlation of the comparison, and displaying the score with the product; and n. printing the resulting product list, corresponding suitability scores, selected tree path, selected use conditions, and entered relative importance of product usability suitability indicators.

19. The machine-readable program storage medium tangibly of claim 18, wherein product useablity suitability indicators are ranked by user-definable importance factors.

20. The machine-readable program storage medium tangibly of claim 18, further comprising printing the resulting product list in sorted order of highest score first.

21. The machine-readable program storage medium tangibly of claim 18, system of claim 1, wherein the user-interface code segment is real-time, interactive for permitting a user to change one or more selections and to evaluate any resulting changes in the product list.

22. The machine-readable program storage medium tangibly of claim 18, further comprising hyperlinks associated with each product in the resulting product list, each hyperlink configured and adapted to retrieve product information regarding the associated product from the Internet or from a database.

* * * * *